W. D. BROOKS.
Can Soldering-Machines.

No. 147,596. Patented Feb. 17, 1874.

W. D. BROOKS.
Can Soldering-Machines.

No. 147,596. Patented Feb. 17, 1874.

UNITED STATES PATENT OFFICE.

WILLIAM D. BROOKS, OF BALTIMORE, MARYLAND, ASSIGNOR TO MARY C. BROOKS AND GEORGE D. BROOKS, OF SAME PLACE.

IMPROVEMENT IN CAN-SOLDERING MACHINES.

Specification forming part of Letters Patent No. 147,596, dated February 17, 1874; application filed May 7, 1873.

*To all whom it may concern:*

Be it known that I, WILLIAM D. BROOKS, of Baltimore, in the county of Baltimore and State of Maryland, have invented a new and useful Improvement in Machines for the Soldering of Cans; and I do hereby declare the following to be a full, clear, and exact description of the same, reference being had to the accompanying drawing forming part of this specification, in which—

Figure 1:
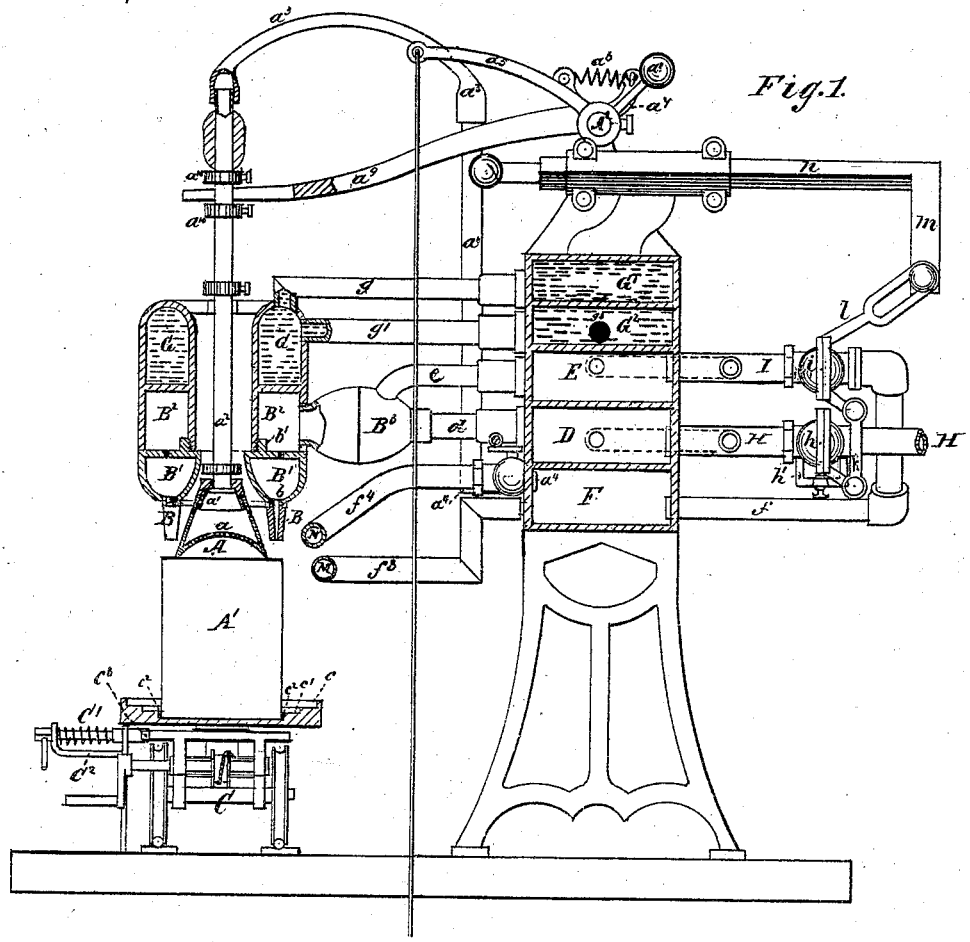
Figure 2:
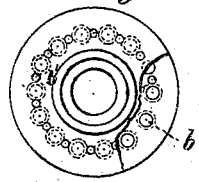
Figure 5:
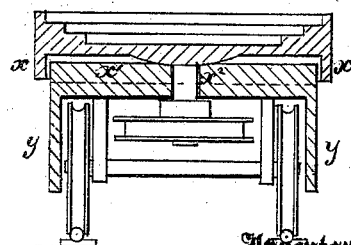
Figure 3:
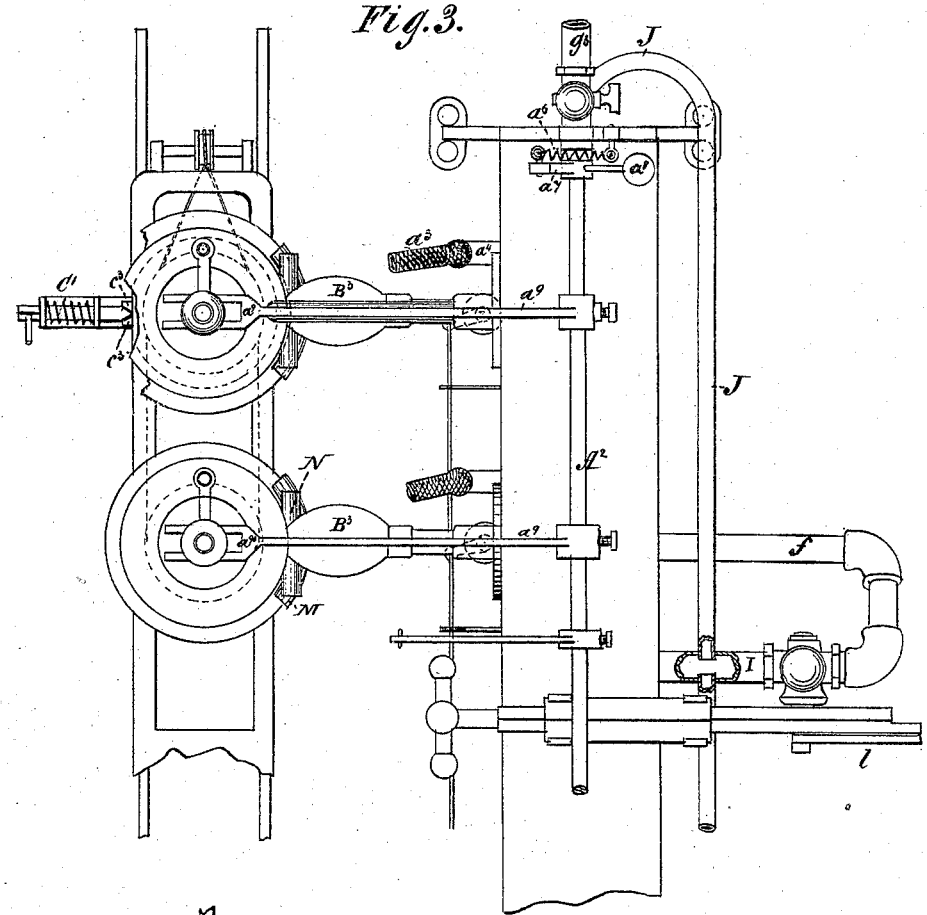
Figure 4:
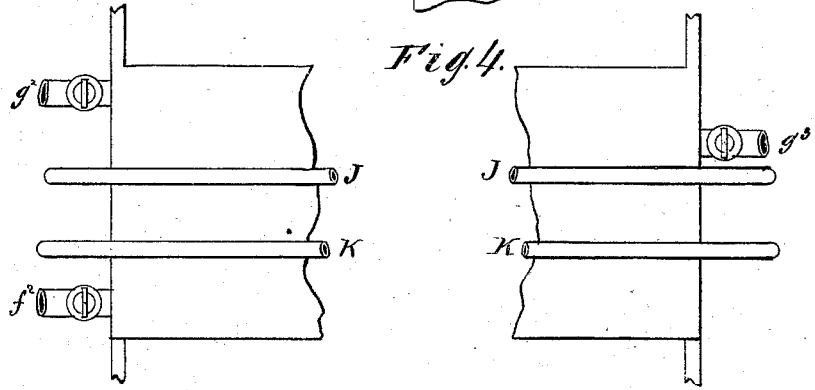

Figure 1 is a sectional side elevation. Fig. 2 is a detailed view in plan, and partly broken away. Fig. 3 is a plan view of the machine. Fig. 4 is a side elevation of air, gas, and water chambers with pipes.

The invention consists in the improvement of machines for the soldering of cans, as hereinafter fully described, and pointed out in the claims.

In the drawing, $A^1$ represents a can placed on the multiple rotary can-holder $c\ c^1\ c^2$, which is journaled in a carriage, C, that travels under the concave top or cap holder A. The carriage is held securely in position by means of a spring-catch, $C^1$, that is arranged in a fixed bracket, $C^2$, and enters the recess formed between two projecting side studs, $c^3\ c^3$, on the carriage. $x$ is a flange, extending down from the can-holder over the fixed disk $x^1$ to prevent the rosin which escapes from finding its way to the journal $x^2$ and gumming and clogging it. $y$ is a downward flange from the platform of truck, and is intended to exclude the wasted rosin from the journals of the wheels of the truck. The top-holder A has a reticulated concave bottom, $a$, and is screwed to a swiveled tube, $a^1$, that opens into a tubular lift-rod, $a^2$, that connects, by a flexible pipe, $a^3$, and tube $a^4$, with the air-chamber F, into which air may be forced in any suitable manner. The object of this arrangement of parts is to fill the cavity of cap-holder A with air, which is distributed through the reticulated bottom $a$. This has the effect of keeping the top-holder A cool, and that part of the top which is under the holder from being discolored by the heat. The heated air readily escapes through apertures in the side of can-holder A. $a^5$ is a rigid arm, of rock-shaft $A^2$, and is connected by a cord or chain with a treadle, which will operate it in one direction, while $a^6$ is a spring, attached at one end to an arm, $a^7$, and at the other to the frame, whereby the shaft is moved in the opposite direction. $a^9$ is a long bifurcated arm, of the same shaft, and embraces the lift-rod $a^2$, its bifurcations being limited in their movement by the fixed collars $a^{10}\ a^{10}$. By this arrangement of parts the cap or top holder A may be readily brought down by a pressure of the foot upon the treadle, while the spring will promptly raise it to allow a new can to come thereunder, the pressure on treadle being removed. The pipe $a^3$, being flexible, will readily accommodate itself to the changes in the position of the lift-rod $a^2$. $a^3$ is a weighted arm, which counterbalances, to a greater or less extent, the weight of cap and top holder A, rod $a^2$, and arm $a^9$, and thus enables a light spring to lift it when the treadle is released. B are the teats or burners, which are screwed or otherwise closely jointed to circular chamber $B^1$, and are provided with the channel-ways $b$. The chamber $B^1$ is perforated on top, and has an annular flange, $b'$, which screws on the threaded inside edge of a gas-receiving chamber, $B^2$, and is thus made readily detachable therefrom. The preferable relative position of the apertures in the top-plate of chamber $B^1$ to the channel-ways $b$ of the teats may be seen in Fig. 2 of the drawing. G is a water-chamber, placed above, and cast in one piece, with the gas-receiver $B^2$, and having pipes $g\ g^1$ that connect, respectively, with water-reservoirs $G^1\ G^2$, one of which receives water from chamber G, while the other discharges into it. $g^2\ g^3$ are pipes, through one of which the water is forced into the top reservoir, while through the other it is forced out of the bottom reservoir. By this means a continuous circulation may be maintained, if it is desired. $B^3$ is a mixing-chamber, in which air is received by pipe $e$ from air-reservoir E, and gas by pipe $d$ from gas-reservoir D. By this means the air and gas undergo a preliminary mixture before entering the receiving-chamber $B^2$, and are then expressed through small holes in the bottom thereof, whereby I find that the gas burns much more effectively, and is more economically applied. H is the pipe, which connects with the main or gas supply and with the reservoir D; and I is the pipe which connects the air-reservoir E with a fan-blower, air-pump, or bellows. $h\ i$ are the cocks, by which the gas and air may be shut off. In order to allow the continuous flow of a small supply of gas to prevent the burners from being extinguished entirely, the supplementary small bridge-pipe $h'$ is used. This is attached to pipe H, on each side of cock, and made to span it, as shown in Fig. 1 of drawing. $k\ l\ m\ n$ represent the mechanism which is employed to close or open the cocks of the air and gas pipes by a simultaneous movement. J J and K K are pipes, which branch out from, and at right angles to, the pipes H I, curve around, and enter the chambers D E at their ends. F is an air-chamber, which may be connected by a pipe, $f$, with the air-chamber E, or be supplied by a pipe, $f^2$, as shown in Fig. 4. $f^3\ f^4$ are two exit-pipes, leading from chamber F to the distributers M N, one of which blows cold air upon the upper edge of the side of can during the soldering operation, while the other blows it upon the holder or protector A after the top or cap has been soldered. This assists materially in preserving the can from the ill effects of too much heat, which is calculated to discolor the metal and impair its strength.

By the several improvements thus elaborately described, and which have only been discovered after many practical experiments, I have greatly lessened the average expense of soldering the top and caps of cans, and have made it possible for unskilled hands to do the work rapidly and well.

Having thus described my invention, what I claim as new, and desire to secure by Letters Patent, is—

1. The side studs $c^3\ c^3$ on carriage combined with the spring-catch $C^1$, arranged on a fixed bracket, as described, so as to lock the carriage under the soldering-machine.

2. The side-apertured cap-holder A, provided with tubular lift-tube $a^2$, connected by a flexible pipe, $a^3$, and tube $a^4$, in combination with a chamber, F, into which air is forced by a pinion, bellows, or fan-blower, as described, and for the purpose set forth.

3. The top or cap holder A, intermediate tube $a^1$, lift-rod $a^2$, made separate and combined in the manner set forth, so as to enable the holder A not only to adjust itself on the top or cap, but to be readily changed for those of different size.

4. The rock-shaft $A^2$, having arms $a^5\ a^7\ a^9$ actuated in one direction by a treadle, and moved in the other by a spring, combined with the lift-rod $a^2$, as set forth, to enable the latter to be raised and clamped upon successive can tops or caps, in the manner specified.

5. The teat-holding chamber $B^1$, having the flange $b'$, connected detachably with the gas-receiving chamber $B^2$, as described, to allow larger or smaller circles of teats or burners to be attached, according to the size of can to be operated upon.

6. The can-holder, having a flange, $x$, extending down over the disk $x^1$, as set forth, to exclude the waste rosin from contact with the journal $x^2$.

7. In a soldering apparatus, the combination, with gas-chamber $B^2$, of a chamber, G, connected by separate pipes, with two reservoirs placed one above another, as described, to secure a circulation of cold water, in the manner and for the purpose specified.

8. The air-chamber F, having pipes $f^3\ f^4$, combined with distributers, arranged as and for the purpose set forth.

WM. D. BROOKS.

Witnesses:
SOLON C. KEMON,
T. D. DURBIN OURAND.